United States Patent [19]

Turner

[11] 4,003,400

[45] Jan. 18, 1977

[54] SELF-DEPRESSURIZING METERING VALVE

[75] Inventor: Bernus G. Turner, Renton, Wash.

[73] Assignee: The Boeing Company, Seattle, Wash.

[22] Filed: Apr. 7, 1975

[21] Appl. No.: 565,901

[52] U.S. Cl. ............................... 137/596; 137/501; 137/613

[51] Int. Cl.[2] ......................................... F16H 11/00

[58] Field of Search ............. 137/501, 596.13, 117, 137/494, 596; 91/451, 446

[56] References Cited

UNITED STATES PATENTS

| | | | |
|---|---|---|---|
| 2,977,971 | 4/1961 | Ruhl | 137/117 X |
| 3,398,649 | 8/1968 | McMillen | 137/596 X |
| 3,526,247 | 9/1970 | McMillen | 137/596.13 |
| 3,534,774 | 10/1970 | Tennis | 137/596 |
| 3,570,522 | 3/1971 | Horsch | 137/501 X |
| 3,777,773 | 12/1973 | Tolbert | 91/446 X |

*Primary Examiner*—Harold W. Weakley
*Attorney, Agent, or Firm*—Al Richardson; Bernard A. Donahue

[57] ABSTRACT

A self-depressurizing hydraulic control valve having a sliding-type metering valve to control the flow of hydraulic fluid through the valve and also a shutoff valve to stop the flow automatically. The shutoff valve is responsive to the rate of flow of fluid through the control valve and stops the flow when the flow rate decreases to a preselected value. When the shutoff valve closes, the control edges of the metering valve are no longer exposed directly to high pressure fluid, and quiescent leakage across the edges is practically eliminated. Thus, electrochemical erosion of the metering edges resulting from such leakage is substantially reduced.

2 Claims, 3 Drawing Figures

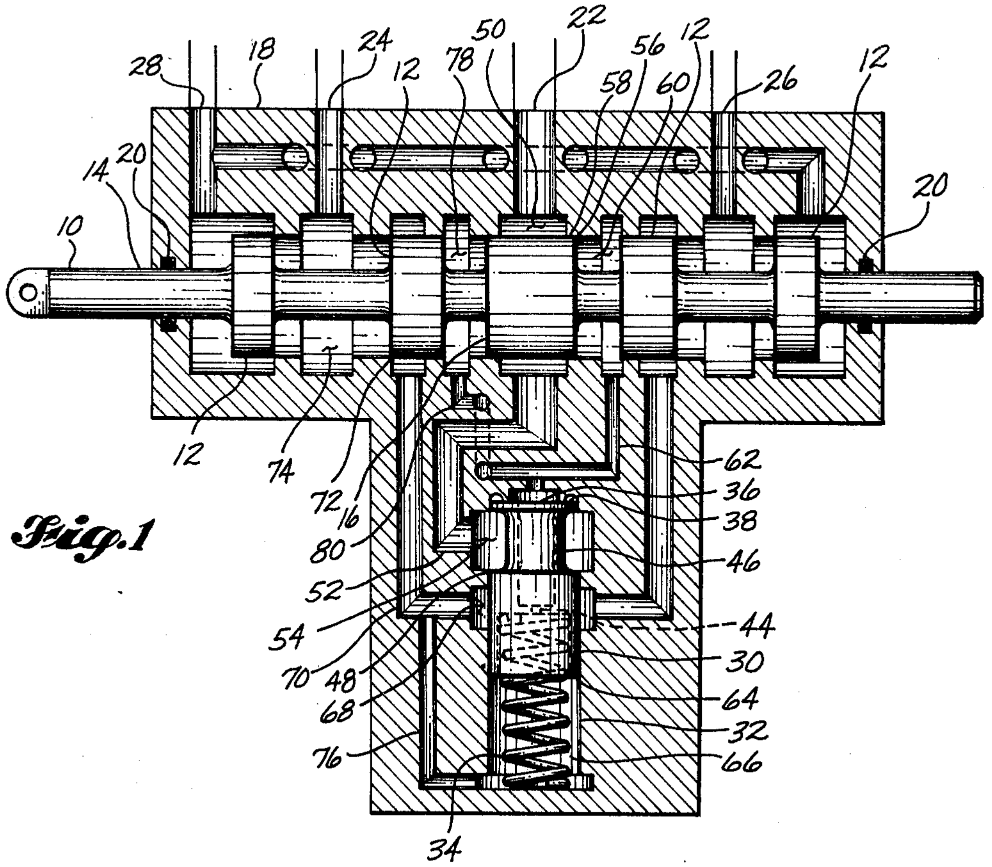
Fig. 1
Fig. 2
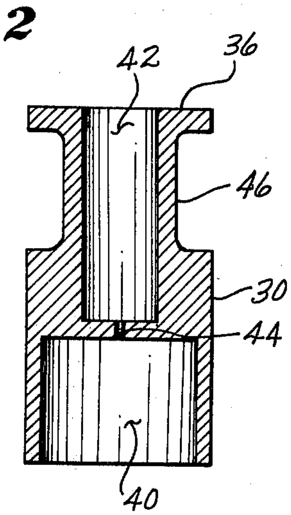

SELF-DEPRESSURIZING METERING VALVE

BACKGROUND OF THE INVENTION

This invention relates to hydraulic control valves and more particularly to a self-depressurizing hydraulic control valve having a shutoff valve which automatically depressurizes the control edges of the metering valve to prevent leakage and consequent electrochemical erosion.

Hydraulic control valves used in high pressure hydraulic systems are known to be subject to various forms of erosion resulting from cavitation, the presence of abrasive particles in the hydraulic fluid, or the existence of an electrokinetic streaming current flowing between the hydraulic fluid and the valve body. These phenomena are thought to act independently and a valve may suffer simultaneous damage during operation from any number of them. It is also thought that the major cause of erosion in high pressure valves is due to the effects of electrokinetic streaming currents. The practical result of such erosion is excessive leakage in the valve, which may in turn result in the overworking and overheating of the entire system. Also, where the valve is controlled by a feedback system, excessive leakage may cause the system to become erratic and unstable.

Of particular interest herein are the high performance servo valves used in aircraft control systems. These valves frequently operate with pressures in the neighborhood of 4,000 pounds per square inch and must offer precise flow control and a high degree of reliability. With the introduction of phosphate ester-based hydraulic fluids in these systems as fire and explosion deterents, a noticeable increase has been observed in the erosion damage and maintenance requirements of such valves.

It has been long known that streaming currents may be produced by the flow of insulating fluids in regions where the fluid is subjected to acceleration. For example, steaming currents sufficiently large to produce sparks have been generated in oil during the filling of petroleum storage tanks. It has also been noted that where streaming currents exist, high concentrations of the ions of certain contaminants in the insulating fluid, such as chlorine, sulphur and phosphorus, have been measured.

A tell-tale sign of electrochemical erosion in a hydraulic valve is the erosion or removal of metal just upstream of a metering edge and a concurrent deposit just downstream of the edge. The erosion occurs primarily when the valve is nulled and a high pressure differential exists across the metering edges. Under these conditions, a small amount of fluid is prone to leak through the metering edges, and it will usually undergo high acceleration while passing between the edges because of the large pressure differentials. When this so-called "quiescent" leakage occurs, charged particles of certain contaminants, having a predominant polarity (either positive or negative) attach themselves to the wall of the valve. This concentration of charged particles creates a small electrical field, and particles of the opposite sign are attracted to the area. The oppositely charged particles usually form a loosely held layer over the area in achieving an electrostatic balance and this resulting arrangement of charged particles is known as an electrical double layer.

Since the fluid in the boundary layer immediately above the surface is in motion, particles in the loosely held upper layer are continually being swept downstream by the fluid, and since the fluid is accelerating, more charged particles are leaving the area than are arriving. The result is a deficiency of charged particles in the upper layer. The erosion of the surface is caused when metal ions of the same sign as the upper layer particles are drawn away from the surface by this electrostatic imbalance. The ions of both the metals and the impurities which are swept away tend to deposit themselves immediately downstream of a metering edge which creates an excess of charged particles in that region. As a result of this flow of charged particles, called a "streaming current," a potential difference is created between areas immediately upstream and downstream of the metering edge and an electrical current begins to flow between these two areas. As this erosion process continues, the metering edge will be progressively damaged and leakage will increase, eventually to the point that the valve must be replaced.

Observation of the streaming current phenomena and duplication of it in the laboratory have indicated that it is a function of the electrical conductivity of the fluid, the strength of the electrical double layer, the fluid viscosity, and the velocity gradient in the fluid boundary layer. Numerous attempts have been made to alter these factors so as to minimize the streaming current and, therefore, the erosion. Some limited success has been achieved by changing the electrical conductivity or by increasing the viscosity of the hyraulic fluid. Other experiments have dealt with the possibility of reducing the strength of the electrical double layer by the addition of certain dipole molcules such as water to the hydraulic fluid. This method is only temporarily effective because the dipole substance eventually becomes saturated and ineffective as the contaminant level rises.

The most obvious and successful solution to the problem has been to attempt to filter out the continuous ions from the fluid by passing it through various types of ion-absorbing materials such as molecular sieves or fuller's earth filters. It is not presently possible, however, even with the best known filtering techniques, to completely remove the contaminating ions from the fluid. Contaminants may be reduced to a very low level and the fluid may appear chemically clean by analysis, but yet it may still have a sufficiently high level of ionic contamination to be erosive.

It is also possible to reduce the streaming current by reducing the velocity gradient in the immediate vicinity of the metering edge. Since the velocity gradient is determined in part by the geometry of the valve near the metering edge, numerous attempts have been made to shape the valve so as to reduce the velocity gradient. A typical example is a design which causes the fluid pressure to drop in a number of steps across a number of metering edges rather than in a single sharp drop across a single edge. Despite the efforts in this area, no significant reductions in electrochemical erosion have been achieved by making changes in valve geometry.

It remains, then, that the best way presently known to minimize the effect of electrokinetic streaming current erosion is to reduce or eliminate leakage flow across the valve when it is closed. It is possible, of course, to design a valve with sufficient overlap between the slide and sleeve to practically eliminate leakage, but such a valve would have a relatively large "deadband" area and would lack the sensitivity necessary for use in an aircraft control system. One way to reduce leakage without sacrificing sensitivity is to block the high pressure supply and depressurize the metering edge when the valve is closed.

It is known in the art to shut off the high pressure flow to a valve in an aircraft flap control system with an electrically operated shutoff valve when the flaps reach the desired position, but such a system is relatively expensive, complex and heavy. It would be possible, of course, to build a system which sensed flap position and then mechanically shut off pressure to the control valve, but such a system would undoubtedly have the same drawbacks.

It is important in the design of a shutoff-type system for use in aircraft that increases in weight and complexity be minimized and that the shutoff feature be actuated only after the flaps have been accurately positioned. In an aircraft flap control system, as in many other hydraulic control systems, hydraulic pressure is not useful as an indicator of control position. System pressures may vary considerably as the flap approaches the desired position, depending upon the aerodynamic loads the system is required to overcome. The rate of flow of hydraulic fluid through the system, and particularly the control valve, however, may be useful as such an indicator because as the control approaches the desired position, the system automatically reduces the system flow rate by moving the valve toward a closed position. The subject of this disclosure is a control valve which contains a shutoff valve which operates in response to system flow rate and shuts off pressure to the metering valve when the system flow rate decreases to a preselected value.

SUMMARY OF THE INVENTION

The invention disclosed herein provides for a hydraulic control valve which has a valve body, a metering valve mounted therein which acts to control the valve of hydraulic fluid through the valve, and some means responsive to the rate of fluid flow through the valve for stopping the flow when the flow rate decreases to a preselected value. In one embodiment, the means for stopping the flow is a shutoff valve mounted in the valve body and urged into a closed position by a spring. The shutoff valve is opened by a hydraulic arming circuit which is controlled by an arming land located on the metering valve. After the shutoff valve has been opened by the actuation of this arming circuit, it is held in an open position by the forces generated by the fluid passing through the valve and will remain open until the fluid flow rate decreases to a preselected minimum value.

In a second embodiment herein described, the means for stopping the flow is also a shutoff valve which is biased toward a closed position by a spring but which is opened by an arming piston. Upon a movement of the metering slide valve out of the null position, the arming piston is forced into contact with the shutoff valve and the shutoff valve is opened, allowing fluid at supply pressure to reach the metering lands on the metering slide valve. As with the first embodiment, the shutoff valve is held in an open position by the forces generated by the flow of fluid through the valve and remains open until the flow rate decreases to a preselected value.

One object of this invention is to provide for a hydraulic control valve having improved resistance to erosion of the metering edges.

Another object of this invention is to provide for a self-depressing hydraulic control valve in which the high pressure hydraulic fluid supply is interrupted when the valve is not in use and prevented from reaching the metering edges of the valve, thus depressing the metering edges.

Another object of this invention is to provide a self-depressing hydraulic control valve in which the metering edges are depressurized when the flow of hydraulic fluid through the valve decreases to a certain preselected minimum value.

BRIEF DESCRIPTION OF THE DRAWINGS

FIG. 1 shows a cross-sectional view of one embodiment of the disclosed valve.

FIG. 2 is a cross-sectional view of the shutoff valve used in the embodiment shown in FIG. 1.

DETAILED DESCRIPTION

Figure 3:
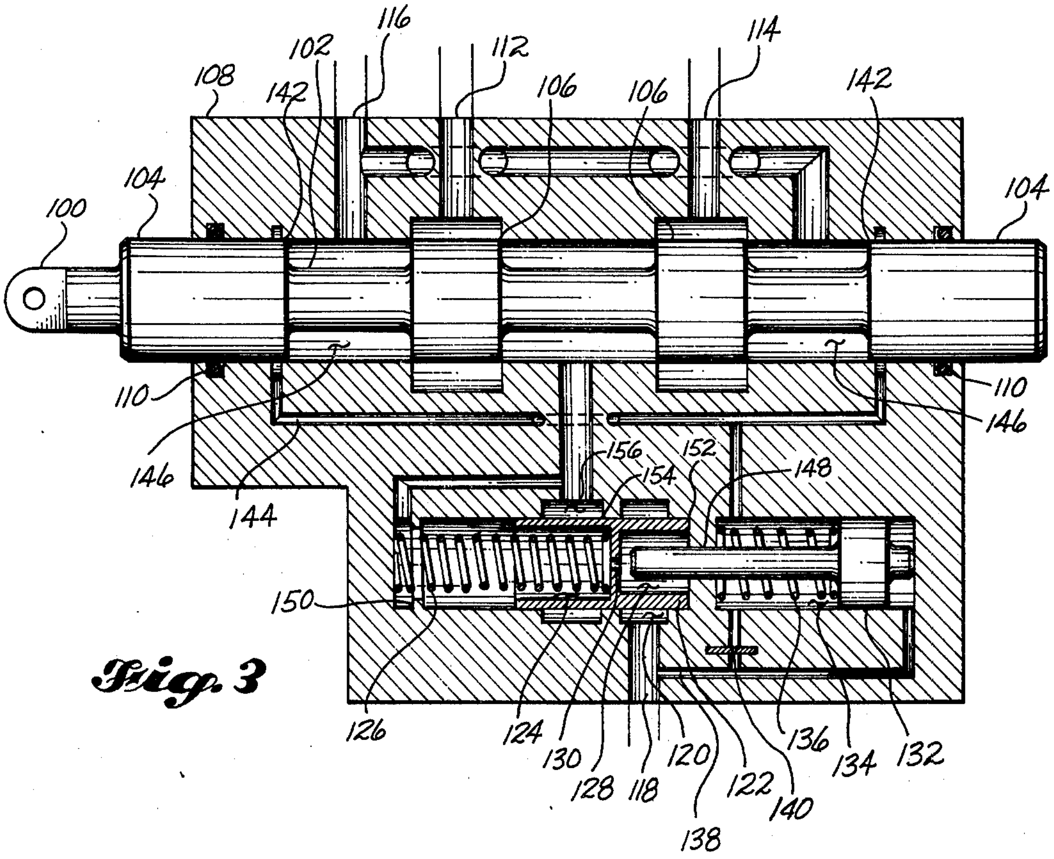
FIG. 3 is a cross-sectional view of a second embodiment of the disclosed valve.

In FIG. 1, a cross-section of one embodiment of this invention is shown. Fundamentally, the device is a four-way metering valve which can supply a high pressure metered flow of fluid through either of two exit or "cylinder" ports, depending upon which direction the metering valve is displaced from the null position. The metering valve 10 is a slide-type valve designed to move axially, either to the left or to the right from the null or neutral position. Four metering lands 12 are axially spaced along the metering valve shaft 14, and an arming land 16 is centrally located on the shaft. Metering valve 10 is slidably mounted in a valve body 18 and seals 20 are installed to prevent leakage of fluid around the shaft.

Hydraulic fluid under high pressure, sometimes herein referred to as supply pressure, enters the valve through supply port 22 and is discharged from the valve either at left cylinder port 24 or at right cylinder port 26, depending on whether metering valve 10 has been displaced to the right or to the left of the null position, respectively.

Shutoff valve 30 is slidably mounted in shutoff valve cavity 32 in the lower portion of the valve body. When the main valve is not in operation, the shutoff valve is held in a closed position in the uppermost part of the shutoff valve cavity by return spring 34 as shown in FIG. 1. In this position, the upper face 36 of the shutoff valve rests against seat 38.

FIG. 2 shows a cross-sectional view of shutoff valve 30. The shutoff valve is basically cylindrical in cross-section and has a lower chamber 40 within which spring 34 is seated. It also has an upper chamber 42 which is connected to the lower chamber by orifice 44 which permits a restricted flow of fluid between the chambers. Recess 46 in the wall of the shutoff valve cooperates with metering edge 48 in the valve body to create an orifice when the shutoff valve is in the open position. As will be later discussed, the flow of fluid through this orifice creates Bernoulli forces sufficient to keep the shutoff valve open.

When the valve is in operation, high pressure hydraulic fluid arriving at supply port 22 bypasses arming land 16 by means of bypass chamber 50 and travels through line 52 to reach chamber 54 which surrounds the recess 46 of the shutoff valve 30. Thus, chamber 54 is continuously supplied with high pressure fluid regardless of the position of metering valve 10. If movement of a control surface is desired, a control input from the pilot causes the servo control system to displace metering valve 14 either to the left or to the right depending on the control movement desired.

Assuming the metering valve is moved to the left a sufficient distance to allow metering edge 56 of arming land 16 to clear overlap 58, then high pressure fluid will flow into chamber 60 through line 62 to reach upper face 36 of shutoff valve 30.

If the automatic control system should move the metering valve to the right, then it can be seen by FIG. 1 that high pressure fluid will reach upper face 36 of the shutoff valve 30 by way of chamber 78 and arming line 80.

The force of the high pressure fluid acting on face 36 will be sufficient to unseat the shutoff valve, compress spring 34 and drive the shutoff valve downward to a fully opened position. At that point, the lower edge 64 of the shutoff valve will be approximately at point 66 on the shutoff valve cavity and high pressure fluid will be permitted to flow between the walls of recess 46 and metering edge 48 into cavity 68. From that point the fluid will pass through line 70, then past metering edge 72, into cavity 74, and finally, out of the valve through left cylinder port 24.

As the fluid passes through the venturi created between the walls of recess 46 and metering edge 48, it experiences a pressure drop which is transmitted to lower chamber 40 of the shutoff valve by way of line 76. Thus when fluid is flowing past the shutoff valve, a pressure differential is created between upper chamber 42 and lower chamber 40 of the shutoff valve, and this pressure differential tends to cause the shutoff valve to travel downward in the shutoff valve cavity. The pressure differential generated by the flow is, of course, dependent upon the rate of flow by the valve and the design of the orifice formed between the walls of recess 46 and metering edge 48.

Once the shutoff valve is opened and a sufficient pressure differential is generated, the shutoff valve will remain open even if the arming circuit is subsequently closed. However, when metering land 12 approaches a closed position and the flow rate is decreased to the point that the upward force of the spring is greater than the downward force caused by the pressure differential, the valve will move upward toward a closed position. The design details of a shutoff valve and shutoff valve cavity combination wherein the shutoff valve will remain open until the flow rate decreases to some desired minimum value should be obvious to those skilled in the art.

The size of overlap 58 is made sufficient to completely prevent leakage of high pressure flow around metering edge 56 into chamber 60 when arming land 16 is centered with respect to bypass cavity 50 (that is the neutral or null position). It is important to note here that although the use of an overlap on arming land 16 produces a "deadband" region in the control system, it affects only the initial motion of the valve. Since the main metering lands 12 have no appreciable overlap, the final positioning accuracy of the system is not degraded.

In FIG. 3, a second embodiment of this invention is illustrated. The primary differences between this embodiment and the one previously described are elimination of the centrally located arming land on the metering slide and the type of arming circuit used to pen the shutoff valve. One advantage of this configuration is that it permits a shorter metering valve to be used which allows a reduction of the overall length of the valve body.

As with the first embodiment, flow metering is accomplished by a side-type metering valve 100 which has a shaft 102 and a number of lands spaced axially along the shaft. Arming lands 104 are located at either end of the shaft and metering lands 106 are spaced between the arming lands. The metering valve is slidably mounted in valve body 108 and seals 110 are installed to prevent leakage around arming lands 104. Valve body 108 is provided with a left cylinder port 112, a right cylinder port 114 and a return port 116. High pressure fluid enters the valve body at supply port 118 and passes directly to cavity 120 which surrounds the upper portion of shutoff valve 122. The shutoff valve is basically similar to shutoff valve 30 except that it does not have a recessed section similar to recess 46. It has a cylindrical cross-section, a lower recess 124 within which return spring 126 is seated and an upper recess 128. Orifice 130 connects the upper and lower recesses and permits the passage of hydraulic fluid between the two cavities. Arming piston 132 is mounted in arming piston cavity 134 and is biased toward the right or in a direction away from the shuttle valve by spring 136. High pressure fluid entering valve body 108 is also transmitted directly to arming piston cavity 134 on both sides of the arming piston by way of line 138.

As long as metering valve 100 remains in the null position, fluid standing in cavities 128 and 134 and lines 138 and 144 remains at supply pressure. When metering valve 100 is moved either to the right or to the left of the null position a sufficient distance for one of the arming pistons 104 to clear its corresponding overlap 142 then one end of line 144 is exposed to return of "sump" pressure which always exists in cavities 146. Since line 144 is connected to the left hand end of arming piston cavity 134, the pressure on the left hand side of the arming piston is quickly reduced to return pressure. The imbalance of pressures on either face of the arming piston causes the piston to move to the left, compressing spring 136 until plunger 148 contacts shutoff valve 122 in the area of orifice 130. The pressure drop in arming piston cavity 134 causes high pressure fluid to flow into the cavity through arming line 138, but fluid flowing into the left hand portion of the cavity is reduced in pressure as it passes through orifice 140.

Arming piston 132 will continue to force the shutoff valve to the left, compressing return spring 126, until the valve reaches the fully open position and contacts stop 150. Plunger 148 will hold the shutoff valve in that position until metering valve 100 is repositioned into the overlap position, covering up the opening in the exposed end of line 144. Subsequently, high pressure fluid will continue to flow through arming line 138, causing the pressure to rise in cavity 134 and causing the arming piston to return to its original position in the cavity. Pressure will continue to rise in cavity 134 and line 144 until it again reaches supply pressure.

When the shutoff valve is resting against stop 150, in the fully open position, edge 152 of the shutoff valve is positioned just to the left of edge 154. With the shutoff valve in this position, high pressure fluid is permitted to flow from cavity 128 through the orifice formed between edges 152 and 154 into cavity 156 and finally past whichever metering land is open into the appropriate cylinder line.

As with the embodiment shown in FIG. 1, shut-off valve 120 remains open even after the effect of the arming means is removed due to the pressure differential existing between cavities 124 and 128 as long as fluid is flowing through the valve at or greater than some preselected rate. Again, the factors involved in designing the valve and valve cavity so that the valve will close when the rate of flow decreases to a certain value should be obvious to those skilled in the art.

Thus in the above disclosure, two different embodiments of the subject invention have been described, each having a means responsive to the rate of fluid flow through the valve for stopping the flow when the flow rate is reduced to a preselected value and each having a different means for arming the flow-stopping means. Although two specific embodiments of this invention have been illustrated and described, it is to be understood that obvious modifications of them may be made without departing from the true spirit and scope of this invention.

What is claimed is:

1. A self-depressurizing hydraulic control valve comprising in combination:

a valve body having a plurality of passageways disposed therein, a supply port for receiving high pressure hydraulic fluid and a cylinder port for delivering a metered flow of said fluid;

a metering valve disposed within a main valve cavity within said valve body for controlling the flow of hydraulic fluid through at least one of said passageways;

a metering land located on said metering valve and having a metering edge;

a hydraulically-actuated shutoff valve located in a shutoff valve chamber within said valve body responsive to the rate of said flow for depressurizing the metering edge when the flow rate is reduced to a preselected value, such shutoff valve further having a centrally located orifice permitting the restricted flow of hyraulic fluid therethrough;

means for biasing said shutoff valve toward a closed position; and means for arming said shutoff valve.

2. A self-depressurizing hydraulic control valve comprising in combination;

a valve body having a plurality of passageways disposed therein, a supply port for receiving high pressure hydraulic fluid and a cylinder port for delivering a metered flow of said fluid.

a metering valve disposed within a main valve cavity within said valve body for controlling the flow of hydraulic fluid through at least one of said passageways;

a shutoff valve located in a shutoff valve chamber within said valve body;

means for biasing said shutoff valve toward a closed position;

means for providing communication between said supply port and said shutoff valve chamber; and an arming land located on said metering valve for controlling the flow of hydraulic fluid through said communication means.

* * * * *

UNITED STATES PATENT AND TRADEMARK OFFICE
CERTIFICATE OF CORRECTION

PATENT NO. : 4,003,400
DATED : Jan. 18, 1977
INVENTOR(S) : Bernus G. Turner

It is certified that error appears in the above-identified patent and that said Letters Patent are hereby corrected as shown below:

Column 3, line 40, delete the word "valve" second occurrence and insert therefor (-flow-).

Column 6, line 38, delete the word "pistons" and insert therefor (-land-).

Signed and Sealed this

Third Day of May 1977

[SEAL]

*Attest:*

RUTH C. MASON
*Attesting Officer*

C. MARSHALL DANN
*Commissioner of Patents and Trademarks*